Patented July 12, 1932

1,866,719

UNITED STATES PATENT OFFICE

DONALD F. OTHMER, OF ROCHESTER, NEW YORK, ASSIGNOR TO EASTMAN KODAK COMPANY, OF ROCHESTER, NEW YORK, A CORPORATION OF NEW YORK

PROCESS OF REMOVING TAR FROM PYROLIGNEOUS LIQUIDS

No Drawing.   Application filed January 19, 1931. Serial No. 509,875.

This invention relates to the removal of tar from pyroligneous fluids by means of a halogeno alkyl ether.

In the wood distilling industry the processes involving the pyroligneous acid obtained therein are greatly hindered by the presence of tar forming bodies. In any subsequent handling of this acid such as neutralization to form calcium acetate, distillation by a direct process to form acetic acid or acetic acid esters, or neutralization with sodium acetate or hydroxide to form sodium acetate for use in the manufacture of anhydrides, it becomes necessary to remove the tar forming bodies and the suspended tar in order that the final product, whatever it may be, will be free from such impurities.

Various solutions of this problem have been proposed. Apparatus of various types have been designed for the removal of the tar, most of which depend on the use of baffles or plates, or on the extraction of the tar with a liquid which either flows counter-current to the gases or through which the gases are bubbled. Various liquids such as tar itself, cresol oils, ethylene dichloride, and other chlorinated hydrocarbons have been mentioned as suitable for this purpose in various types of processes. However, many of the liquids that have been suggested as suitable may not have a wide range of utility so that they may be used in either alkaline, acid or neutral materials; some may be difficult to separate from the pyroligneous acids and thereby contaminate the various chemicals and some may be desirable for removal of tar but because of their cost could not be used commercially to any advantage.

I have now found that by the extraction of either raw, treated or neutralized acids with a fraction of its volume of a halogeno alkyl ether such as for example, beta-beta' dichloroethyl ether, the tar and tar forming bodies may be removed. This extraction may be accomplished in a variety of ways such as for example by agitating together the dichloroethyl ether and the pyroligneous acid and allowing the mixture to separate into two layers whereupon the dichloroethyl ether containing the tar settles and may be drawn off, leaving a substantially tar-free liquid. The dichloroethyl ether may be used in any kind of a counter-current liquid extracting apparatus, or in an apparatus in which a liquid is sprayed over gases or vapors while they pass through a baffle passage, or in any other type of tar removing apparatus which has been disclosed in the prior art, which makes use of washing, treating or scrubbing by a liquid for the purpose of removing tar.

In most cases the raw or the demethanolized acid is to be treated, but in some instances it becomes necessary to remove the tar from a pyroligneous liquid which has been neutralized perhaps even to the point of alkalinity. The particular solvents I have found suitable may be used to treat the fluid regardless of the degree of acidity or alkalinity met with, without any danger of decomposition. In addition to resistance to acids and alkalies, the dichloroalkyl ethers being liquids of high specific gravity can be readily separated from the pyroligneous acids by gravity settling. The various solvents which may be used in addition to beta-beta' dichloroethyl ether mentioned above are alpha-beta dichloroethyl ether, gamma-gamma' dibromopropyl ether, gamma-gamma' dichloropropyl ether. Mixtures of these solvents in any combination may be used instead of using them singly if desired. These compounds which consist of an alkyl ether in which two hydrogen atoms have been substituted by halogen atoms are termed dihalogeno-alkyl ethers in this application.

Other possibilities and modifications apparent to those skilled in the art obviously are within the contemplation of this invention.

What I now claim as my invention and desire to be secured by Letters Patent of the United States is:

1. The process of absorbing pyroligneous tarry compounds which comprises treating with a material containing a dihalogeno-alkyl ether, fluid resulting from the destructive distillation of wood.

2. A process for absorbing pyroligneous tarry compounds which comprises treating with a material containing a dichloralkyl ether, fluid resulting from the destructive distillation of wood.

3. A process for absorbing pyroligneous tarry compounds which comprises treating with a material containing a dichloroethyl ether, fluid resulting from the destructive distillation of wood.

4. A process for absorbing pyroligneous tarry compounds which comprises treating with a material containing a dichloroethyl ether, fluid driven off from wood by the destructive distillation thereof.

5. A process for absorbing pyroligneous tarry compounds which comprises treating with a material containing a dichloroethyl ether, the vapor driven off from wood by the destructive distillation thereof.

6. A process for absorbing pyroligneous tarry compounds which comprises treating a pyroligneous liquid with a material containing a dichloroethyl ether.

7. A process for absorbing pyroligneous tarry compounds which comprises treating with a material containing beta-beta' dichloroethyl ether, fluid resulting from the destructive distillation of wood.

8. A process for absorbing pyroligneous tarry compounds which comprises treating a pyroligneous liquid with a material containing beta-beta' dichloroethyl ether.

9. A process for absorbing pyroligneous tarry compounds which comprises treating a pyroligneous liquid with a beta-beta' dichloroethyl ether.

10. A process for absorbing pyroligneous tarry compounds which comprises agitating a pyroligneous liquid with a beta-beta' dichloroethyl ether.

11. A process for absorbing pyroligneous tarry compounds which comprises agitating a pyroligneous liquid with a beta-beta' dichloroethyl ether and then separating the tarry dichloroethyl ether solution therefrom.

Signed at Rochester, New York this 10th day of January, 1931.

DONALD F. OTHMER.